United States Patent
Wang et al.

(10) Patent No.: US 11,387,940 B2
(45) Date of Patent: Jul. 12, 2022

(54) TRANSMITTING FRAGMENTS OF ETHERNET FRAME WITH INDICATING ERROR OCCURRING IN ETHERNET FRAME

(71) Applicant: Huawei Technologies Co., Ltd., Shenzhen (CN)

(72) Inventors: Tongtong Wang, Beijing (CN); Xinyuan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

(21) Appl. No.: 17/038,790

(22) Filed: Sep. 30, 2020

(65) Prior Publication Data

US 2021/0014000 A1  Jan. 14, 2021

Related U.S. Application Data

(63) Continuation of application No. PCT/CN2018/081495, filed on Mar. 31, 2018.

(51) Int. Cl.
*H04L 1/00* (2006.01)
*G06F 11/10* (2006.01)
*G06F 11/00* (2006.01)

(52) U.S. Cl.
CPC ........ *H04L 1/0076* (2013.01); *G06F 11/1004* (2013.01); *H04L 1/0072* (2013.01)

(58) Field of Classification Search
CPC ... H04L 1/0076; H04L 1/0072; G06F 11/1004
See application file for complete search history.

(56) References Cited

U.S. PATENT DOCUMENTS 7,089,485 B2 *  8/2006  Azadet ................. H04L 1/0061
                                                              370/503
8,402,343 B2     3/2013  Radulescu
9,515,694 B1 * 12/2016  Sidiropoulos .......... H04L 25/03
(Continued)

FOREIGN PATENT DOCUMENTS

CN       101043355 A     9/2007
CN       101180838 A     5/2008
(Continued)

OTHER PUBLICATIONS

IEEE Std 802.3-2015, "IEEE Standard for Ethernet," IEEE 3 Park Avenue, New York, NY 10016-5997, USA, Sep. 2015, 4017 pages.

*Primary Examiner* — Justin R Knapp
(74) *Attorney, Agent, or Firm* — Conley Rose, P.C.

(57) ABSTRACT

A method including a network device receives a plurality of fragments of an Ethernet frame, where the plurality of fragments include an initial fragment and a first fragment, and the initial fragment includes a destination media access control (MAC) address field, in response to an error that occurs in the Ethernet frame, changes the first fragment to a second fragment, where the second fragment includes second type indication information (TII) and second to-be-transmitted data (TBTD), the second TII indicates that a type of the second TBTD is a control character, a value of first TBTD is different from a value of the second TBTD, and the second TBTD indicates that an error occurs in the Ethernet frame, and the network device sends the second fragment to a destination device.

20 Claims, 3 Drawing Sheets

(56) References Cited

U.S. PATENT DOCUMENTS

| | | | |
|---|---|---|---|
| 9,692,715 B2* | 6/2017 | Krakirian | H04L 49/3063 |
| 10,404,623 B2* | 9/2019 | Krakirian | H04L 49/30 |
| 2006/0013215 A1 | 1/2006 | Kong et al. | |
| 2006/0268997 A1 | 11/2006 | Thaler | |
| 2009/0103441 A1 | 4/2009 | Nakamura | |
| 2010/0199144 A1 | 8/2010 | Li et al. | |
| 2011/0222490 A1 | 9/2011 | Fischer et al. | |
| 2012/0257511 A1 | 10/2012 | Kamada | |
| 2015/0117177 A1 | 4/2015 | Ganga et al. | |
| 2017/0147812 A1 | 5/2017 | Ujiie et al. | |
| 2017/0324657 A1 | 11/2017 | Zhong | |
| 2019/0097758 A1 | 3/2019 | Huang et al. | |
| 2019/0140861 A1 | 5/2019 | Zhong et al. | |
| 2020/0280457 A1 | 9/2020 | Inoue et al. | |

FOREIGN PATENT DOCUMENTS

| | | |
|---|---|---|
| CN | 102668432 A | 9/2012 |
| CN | 105871502 A | 8/2016 |
| CN | 106788894 A | 5/2017 |
| CN | 107370674 A | 11/2017 |
| CN | 107428294 A | 12/2017 |
| EP | 3242430 A1 | 11/2017 |
| JP | 2001308753 A | 11/2001 |
| JP | 2005006036 A | 1/2005 |
| JP | 2006333478 A | 12/2006 |
| JP | 2009239897 A | 10/2009 |
| JP | 2012253528 A | 12/2012 |
| JP | 2017121091 A | 7/2017 |
| JP | 2019517198 A | 6/2019 |
| JP | 2019527499 A | 9/2019 |
| WO | 2011074298 A1 | 6/2011 |
| WO | 2018163229 A1 | 9/2018 |

* cited by examiner

TRANSMITTING FRAGMENTS OF ETHERNET FRAME WITH INDICATING ERROR OCCURRING IN ETHERNET FRAME

CROSS-REFERENCE TO RELATED APPLICATIONS

The application is a continuation of International Patent Application No. PCT/CN2018/081495 filed on Mar. 31, 2018, the disclosure of which is hereby incorporated by reference in its entirety.

TECHNICAL FIELD

This application relates to the field of communications, and more specifically, to a data transmission method and a forwarding device in the field of communications.

BACKGROUND

The industrial internet of things and the Internet of Vehicles usually include a plurality of forwarding devices. Data sent by a source device is forwarded using a plurality of forwarding devices, to reach a destination device. The plurality of forwarding devices may form a chain network or a ring network.

When data is forwarded using the chain network or the ring network, each forwarding device may cause some delays. Consequently, an end-to-end delay cannot meet requirements of some application scenarios.

A cut-through forwarding technology can reduce the end-to-end delay. For example, in the cut-through forwarding technology, a forwarding device may start to send a received fragment to a next-hop forwarding device when not receiving an entire Ethernet frame. Specifically, an Ethernet frame 1 includes a fragment 1, a fragment 2, and a fragment 3. A forwarding device 1 may send the fragment 1 to a forwarding device 2 when receiving only the fragment 1, and not receiving the fragment 2 and the fragment 3.

An error may occur in an Ethernet frame in a transmission process. When an Ethernet frame received by the destination device includes a relatively large quantity of errors, the destination device may be unable to detect, by performing cyclic redundancy check (CRC) on the received Ethernet frame, that the Ethernet frame includes an error. As a result, an exception occurs in a data transmission service.

SUMMARY

This application provides a data transmission method, to help to increase a success rate of detecting by a destination device that an Ethernet frame includes an error.

According to a first aspect, a data transmission method is provided and includes receiving, by a first forwarding device, a plurality of fragments of an Ethernet frame, where the plurality of fragments include an initial fragment and a first fragment, and the initial fragment includes a destination media access control (MAC) address field, determining, by the first forwarding device, a frame check sequence (FCS) value of the Ethernet frame based on the plurality of fragments, determining, by the first forwarding device based on the FCS value, that an error occurs in the Ethernet frame, changing, by the first forwarding device, the first fragment to a second fragment in response to the determining that an error occurs in the Ethernet frame, where the first fragment includes first type indication information and first to-be-transmitted data, the second fragment includes second type indication information and second to-be-transmitted data, the first type indication information is used to indicate a type of the first to-be-transmitted data, the second type indication information is used to indicate that a type of the second to-be-transmitted data is a control character, a value of the first to-be-transmitted data is not equal to a value of the second to-be-transmitted data, and the second to-be-transmitted data is used to indicate that an error occurs in the Ethernet frame, and sending, by the first forwarding device, the second fragment to a destination device, where a value of the destination MAC address field is equal to a MAC address of the destination device, and the MAC address of the destination device is not equal to a MAC address of the first forwarding device.

In a process in which the Ethernet frame is transmitted from a source device to the destination device, the forwarding device performs CRC check on the Ethernet frame, to find whether an error occurs in the Ethernet frame. When the forwarding device finds that an error occurs in the Ethernet frame, the forwarding device changes the received fragment of the Ethernet frame such that a changed fragment (the second fragment) indicates that an error occurs in the Ethernet frame. For example, the second fragment may include an error control character. The error control character is used to indicate that an error occurs in the Ethernet frame. The forwarding device sends the second fragment to the destination device. Therefore, a physical layer (PHY) circuit of the destination device determines, based on the second fragment, that an error occurs in the received Ethernet frame. Specifically, the PHY circuit of the destination device includes a PCS receiver. The second fragment includes the error control character. The PCS receiver determines, based on the error control character, that an error occurs in the Ethernet frame. For example, the PCS receiver enters a receive enable (RX_E) state based on the error control character. The PCS receiver in the RX_E state generates a signal. The signal includes a receive control (RxC) field with a value of 1 and a receive data (RxD) field with a value of 0xFE. The PCS receiver sends the signal to a MAC circuit of the destination device through a media independent interface (MII). The MAC circuit of the destination device may determine, based on the signal, that an error occurs in the Ethernet frame. Further, the MAC circuit of the destination device may discard the Ethernet frame. In other words, without needing to perform CRC check on the received Ethernet frame, the MAC circuit of the destination device can determine that an error occurs in the Ethernet frame. Compared with a technical solution in which the destination device performs CRC check on the Ethernet frame to determine that an error occurs in the Ethernet frame, the foregoing technical solution helps to increase a success rate of detecting by the destination device that the Ethernet frame includes an error. Specifically, due to a feature of a CRC algorithm, when an Ethernet frame includes a relatively small quantity of errors, it is relatively easy to detect the errors of the Ethernet frame through CRC check. When an Ethernet frame includes a relatively large quantity of errors, the errors of the Ethernet frame may not be detected through CRC check. A plurality of errors may be caused in a process in which an Ethernet frame is transmitted from the source device to the destination device. A relatively large quantity of errors is probably caused especially when an Ethernet frame needs to be forwarded using a plurality of forwarding devices. In addition, before a forwarding device sends an Ethernet frame to a next-hop forwarding device or a destination device, the forwarding device may recalculate an FCS value of the Ethernet frame, and add a recalculated FCS value to an FCS field of the Ethernet frame. When recalculating the FCS value of the Ethernet frame, the forwarding device uses a field other than the FCS field in the Ethernet frame as a parameter. This means that if an error occurs in the Ethernet frame, the error is also used as a parameter required for recalculating the FCS value of the Ethernet frame. Consequently, the next-hop forwarding device or the destination device cannot detect, through CRC check, that the received Ethernet frame includes an error.

In the technical solution provided in this application, the PHY circuit of the destination device may determine, based on a changed field, that an error occurs in the Ethernet frame. The destination device does not need to depend on CRC check to determine whether an error occurs in the Ethernet frame. Therefore, the technical solution in this application helps to increase a success rate of detecting by the destination device that the Ethernet frame includes an error.

With reference to the first aspect, in a possible implementation of the first aspect, the responding to, by the first forwarding device, the changing, by the first forwarding device, the first fragment to a second fragment in response to the determining that an error occurs in the Ethernet frame includes respectively changing, by the first forwarding device, the first type indication information and the first to-be-transmitted data in the first fragment to the second type indication information and the second to-be-transmitted data when a value of the first type indication information is not equal to a value of the second type indication information, or changing, by the first forwarding device, the first to-be-transmitted data in the first fragment to the second to-be-transmitted data when a value of the first type indication information is equal to a value of the second type indication information.

The type indication information in the first fragment is changed such that a type of to-be-transmitted data that is indicated by changed type indication information in the first fragment is a control character, and the to-be-transmitted data in the first fragment is changed such that a value of changed to-be-transmitted data can indicate, to the destination device, that an error occurs in the Ethernet frame in a transmission process. Therefore, when receiving the Ethernet frame, the destination device determines, based on the changed first fragment (the second fragment), that an error occurs in the Ethernet frame in the transmission process.

With reference to the first aspect, in a possible implementation of the first aspect, the second fragment includes an RxC field and an RxD field, the RxC field is used to carry the second type indication information, and a value of the RxD field is the second to-be-transmitted data.

A value of the RxC field is used to indicate, to the destination device, that the value of the RxD field is a control octet, and the value of the RxD field is used to indicate, to the destination device, that an error occurs in the Ethernet frame in the transmission process. Therefore, when determining that the value of the RxD field is a control octet, the destination device further checks a value of a control code of the RxD field, and finally determines, based on the value of the control code of the RxD field, that an error occurs in the Ethernet frame in the transmission process, thereby discarding the Ethernet frame.

With reference to the first aspect, in a possible implementation of the first aspect, the value of the RxC field is 1, and the value of the RxD field is equal to 0xFE.

With reference to the first aspect, in a possible implementation of the first aspect, the second fragment includes a synchronization header field, a block type field, and a plurality of pieces of to-be-transmitted data, the plurality of pieces of to-be-transmitted data include the second to-be-transmitted data, the second type indication information includes the synchronization header field and the block type field, the second type indication information is used to indicate that the type of the second to-be-transmitted data is a control character, and the second type indication information is further used to indicate a location of the second to-be-transmitted data in the plurality of pieces of to-be-transmitted data.

A value of the synchronization header field is used to indicate, to the destination device, whether to-be-transmitted data with a type of control character is included behind the synchronization header field, a value of the block type field is used to indicate, to the destination device, a location of to-be-transmitted data, behind the block type field, with a type of control character in the plurality of pieces of to-be-transmitted data, and a value of the to-be-transmitted data corresponding to the location is used to indicate, to the destination device, that an error occurs in the Ethernet frame in the transmission process. Therefore, after determining the location of the to-be-transmitted data with the type of control character, the destination device further checks the value of the to-be-transmitted data corresponding to the location, and finally determines, based on the value of the to-be-transmitted data corresponding to the location, that an error occurs in the Ethernet frame in the transmission process, thereby discarding the Ethernet frame.

With reference to the first aspect, in a possible implementation of the first aspect, the value of the second to-be-transmitted data is equal to 0x1E.

With reference to the first aspect, in a possible implementation of the first aspect, the to-be-transmitted data in the first fragment includes an FCS field, or the first fragment does not include an FCS field.

Any fragment other than the initial fragment in the Ethernet frame is changed such that when receiving the changed fragment, the destination device determines, based on the changed fragment, that an error occurs in the Ethernet frame in the transmission process, thereby discarding the Ethernet frame.

With reference to the first aspect, in a possible implementation of the first aspect, the determining, by the first forwarding device based on the FCS value, that an error occurs in the Ethernet frame includes, when the FCS value is not equal to a value of the FCS field, determining, by the first forwarding device, that an error occurs in the Ethernet frame.

According to a second aspect, a data transmission method is provided and includes receiving, by a second forwarding device, an initial fragment and a first fragment, where the first fragment includes type indication information and to-be-transmitted data, the type indication information is used to indicate a type of the to-be-transmitted data, the type of the to-be-transmitted data is a control character, the to-be-transmitted data is used to indicate that an error occurs in an Ethernet frame, the Ethernet frame includes the initial fragment, the initial fragment includes a destination MAC address field, a value of the destination MAC address field is equal to a MAC address of a destination device, and a MAC address of the second forwarding device is not equal to the value of the destination MAC address field, and sending, by the second forwarding device, the first fragment to the destination device.

In a process in which the Ethernet frame is transmitted from a source device to the destination device, the forwarding device performs CRC check on the Ethernet frame, to find whether an error occurs in the Ethernet frame. When the forwarding device finds that an error occurs in the Ethernet frame, the forwarding device changes the received fragment of the Ethernet frame such that a changed fragment (a second fragment) indicates that an error occurs in the Ethernet frame. For example, the second fragment may include an error control character. The error control character is used to indicate that an error occurs in the Ethernet frame. The forwarding device sends the second fragment to the destination device. Therefore, a PHY circuit of the destination device determines, based on the second fragment, that an error occurs in the received Ethernet frame. Specifically, the PHY circuit of the destination device includes a PCS receiver. The second fragment includes the error control character. The PCS receiver determines, based on the error control character, that an error occurs in the Ethernet frame. For example, the PCS receiver enters an RX_E state based on the error control character. The PCS receiver in the RX_E state generates a signal. The signal includes an RxC field with a value of 1 and an RxD field with a value of 0xFE. The PCS receiver sends the signal to a MAC circuit of the destination device through an MII. The MAC circuit of the destination device may determine, based on the signal, that an error occurs in the Ethernet frame. Further, the MAC circuit of the destination device may discard the Ethernet frame. In other words, without needing to perform CRC check on the received Ethernet frame, the MAC circuit of the destination device can determine that an error occurs in the Ethernet frame. Compared with a technical solution in which the destination device performs CRC check on the Ethernet frame to determine that an error occurs in the Ethernet frame, the foregoing technical solution helps to increase a success rate of detecting by the destination device that the Ethernet frame includes an error. Specifically, due to a feature of a CRC algorithm, when an Ethernet frame includes a relatively small quantity of errors, it is relatively easy to detect the errors of the Ethernet frame through CRC check. When an Ethernet frame includes a relatively large quantity of errors, the errors of the Ethernet frame may not be detected through CRC check. A plurality of errors may be caused in a process in which an Ethernet frame is transmitted from the source device to the destination device. A relatively large quantity of errors is probably caused especially when an Ethernet frame needs to be forwarded using a plurality of forwarding devices. In addition, before a forwarding device sends an Ethernet frame to a next-hop forwarding device or a destination device, the forwarding device may recalculate an FCS value of the Ethernet frame, and add a recalculated FCS value to an FCS field of the Ethernet frame. When recalculating the FCS value of the Ethernet frame, the forwarding device uses a field other than the FCS field in the Ethernet frame as a parameter. This means that if an error occurs in the Ethernet frame, the error is also used as a parameter required for recalculating the FCS value of the Ethernet frame. Consequently, the next-hop forwarding device or the destination device cannot detect, through CRC check, that the received Ethernet frame includes an error.

In the technical solution provided in this application, the PHY circuit of the destination device may determine, based on a changed field, that an error occurs in the Ethernet frame. The destination device does not need to depend on CRC check to determine whether an error occurs in the Ethernet frame. Therefore, the technical solution in this application helps to increase a success rate of detecting by the destination device that the Ethernet frame includes an error.

With reference to the second aspect, in a possible implementation of the second aspect, the Ethernet frame further includes a second fragment, and before the second forwarding device receives the first fragment, in response to determining, after CRC check is performed on the Ethernet frame, that an error occurs in the Ethernet frame, the second fragment is changed to the first fragment.

With reference to the second aspect, in a possible implementation of the second aspect, after the receiving, by a second forwarding device, an initial fragment and a first fragment, and before the sending, by the second forwarding device, the first fragment to the destination device, the method further includes determining, by the second forwarding device based on the destination MAC address field, that the MAC address of the second forwarding device is not equal to the value of the destination MAC address field, and the sending, by the second forwarding device, the first fragment to the destination device includes, in response to the determining that the MAC address of the second forwarding device is not equal to the value of the destination MAC address field, sending, by the second forwarding device, the first fragment to the destination device.

With reference to the second aspect, in a possible implementation of the second aspect, the second forwarding device includes a physical coding sublayer (PCS) receiver, and after the second forwarding device receives the first fragment, the method further includes, in response to the to-be-transmitted data, entering, by the PCS receiver, an RX_E state.

With reference to the second aspect, in a possible implementation of the second aspect, the first fragment includes an RxC field and an RxD field, the RxC field carries the type indication information, and the RxD field carries the to-be-transmitted data.

A value of the RxC field is used to indicate, to the destination device, that the value of the RxD field is a control octet, and the value of the RxD field is used to indicate, to the destination device, that an error occurs in the Ethernet frame in the transmission process. Therefore, when determining that the value of the RxD field is a control octet, the destination device further checks a value of a control code of the RxD field, and finally determines, based on the value of the control code of the RxD field, that an error occurs in the Ethernet frame in the transmission process, thereby discarding the Ethernet frame.

With reference to the second aspect, in a possible implementation of the second aspect, a value of the RxC field is equal to 1, and a value of the RxD field is equal to 0xFE.

With reference to the second aspect, in a possible implementation of the second aspect, the first fragment includes a synchronization header field, a block type field, and a plurality of pieces of to-be-transmitted data, the plurality of pieces of to-be-transmitted data include the to-be-transmitted data, the type indication information includes the synchronization header field and the block type field, the type indication information is used to indicate that the type of the to-be-transmitted data is a control character, and the type indication information is further used to indicate a location of the to-be-transmitted data in the plurality of pieces of to-be-transmitted data.

A value of the synchronization header field is used to indicate, to the destination device, whether to-be-transmitted data with a type of control character is included behind the synchronization header field, a value of the block type field is used to indicate, to the destination device, a location of to-be-transmitted data, behind the block type field, with a type of control character in the plurality of pieces of to-betransmitted data, and a value of the to-be-transmitted data corresponding to the location is used to indicate, to the destination device, that an error occurs in the Ethernet frame in the transmission process. Therefore, after determining the location of the to-be-transmitted data with the type of control character, the destination device further checks the value of the to-be-transmitted data corresponding to the location, and finally determines, based on the value of the to-be-transmitted data corresponding to the location, that an error occurs in the Ethernet frame in the transmission process, thereby discarding the Ethernet frame.

With reference to the second aspect, in a possible implementation of the second aspect, a value of the synchronization header field is equal to 0x10, and a value of the to-be-transmitted data is equal to 0x1E.

With reference to the second aspect, in a possible implementation of the second aspect, to-be-transmitted data in the second fragment includes a FCS field of the Ethernet frame, or the second fragment does not include a FCS field of the Ethernet frame.

Any fragment other than the initial fragment in the Ethernet frame is changed such that when receiving the changed fragment, the destination device determines, based on the changed fragment, that an error occurs in the Ethernet frame in the transmission process, thereby discarding the Ethernet frame.

According to a third aspect, a forwarding apparatus is provided and includes modules configured to perform steps of the data transmission method in the first aspect and the implementations of the first aspect.

According to a fourth aspect, a forwarding device is provided and includes a receiving circuit, a processing circuit, and a sending circuit, where the receiving circuit is configured to receive a plurality of fragments of an Ethernet frame, where the plurality of fragments include an initial fragment and a first fragment, and the initial fragment includes a destination MAC address field, the processing circuit is configured to determine a FCS value of the Ethernet frame based on the plurality of fragments, determine, based on the FCS value, that an error occurs in the Ethernet frame, and change the first fragment to a second fragment in response to the determining that an error occurs in the Ethernet frame, where the first fragment includes first type indication information and first to-be-transmitted data, the second fragment includes second type indication information and second to-be-transmitted data, the first type indication information is used to indicate a type of the first to-be-transmitted data, the second type indication information is used to indicate that a type of the second to-be-transmitted data is a control character, a value of the first to-be-transmitted data is not equal to a value of the second to-be-transmitted data, and the second to-be-transmitted data is used to indicate that an error occurs in the Ethernet frame, and the sending circuit is configured to send the second fragment to a destination device, where a value of the destination MAC address field is equal to a MAC address of the destination device, and the MAC address of the destination device is not equal to a MAC address of the forwarding device.

According to a fifth aspect, a forwarding device is provided, where the forwarding device includes a processor and a memory, the processor is configured to invoke a program stored by the memory, to perform the data transmission method in the first aspect or any possible implementation of the first aspect.

According to a sixth aspect, a computer program product is provided, where the computer program product includes computer program code, and when a processing module and a communications module, or a processor and a transceiver of a forwarding device run the computer program code, the forwarding device performs the data transmission method in the first aspect and any implementation of the first aspect.

According to a seventh aspect, a computer readable storage medium is provided, where the computer readable storage medium stores a program, and when the program is executed, causes a forwarding device performs the data transmission method in the first aspect and any implementation of the first aspect.

According to an eighth aspect, a chip system is provided and includes a memory and a processor, where the memory is configured to store a computer program, and the processor is configured to invoke and run the computer program in the memory such that a forwarding device in which the chip system is installed performs the data transmission method in the first aspect and any implementation of the first aspect.

According to a ninth aspect, a forwarding apparatus is provided and includes modules configured to perform steps of the data transmission method in the second aspect and the implementations of the second aspect.

According to a tenth aspect, a forwarding device is provided and includes a receiving circuit and a sending circuit, where the receiving circuit is configured to receive an initial fragment and a first fragment, where the first fragment includes type indication information and to-be-transmitted data, the type indication information is used to indicate a type of the to-be-transmitted data, the type of the to-be-transmitted data is a control character, the to-be-transmitted data is used to indicate that an error occurs in an Ethernet frame, the Ethernet frame includes the initial fragment, the initial fragment includes a destination MAC address field, a value of the destination MAC address field is equal to a MAC address of a destination device, and a MAC address of the forwarding device is not equal to the value of the destination MAC address field, and the sending circuit is configured to send the first fragment to the destination device.

According to an eleventh aspect, a forwarding device is provided, where the forwarding device includes a processor and a memory, the processor is configured to invoke a program stored by the memory, to perform the data transmission method in the second aspect or any possible implementation of the second aspect.

According to a twelfth aspect, a computer program product is provided, where the computer program product includes computer program code, and when a processing module and a communications module, or a processor and a transceiver of a forwarding device run the computer program code, the forwarding device performs the data transmission method in the second aspect and any implementation of the second aspect.

According to a thirteenth aspect, a computer readable storage medium is provided, where the computer readable storage medium stores a program, and when the program is executed, cause a forwarding device performs the data transmission method in the second aspect and any implementation of the second aspect.

According to a fourteenth aspect, a chip system is provided and includes a memory and a processor, where the memory is configured to store a computer program, and the processor is configured to invoke and run the computer program in the memory such that a forwarding device in which the chip system is installed performs the data transmission method in the second aspect and any implementation of the second aspect.

According to a fifteenth aspect, a system is provided, where the system includes the forwarding apparatus of the third aspect and the forwarding apparatus of the ninth aspect, or the system includes the forwarding device of the fourth aspect and the forwarding device of the tenth aspect, or the system includes the forwarding device of the fifth aspect and the forwarding device of the eleventh aspect.

DESCRIPTION OF EMBODIMENTS

Figure 1:
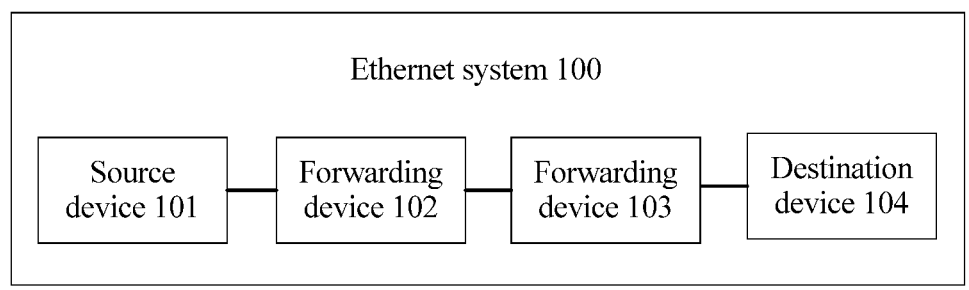
FIG. 1 is a schematic block diagram of an Ethernet system 100 applicable to an embodiment of this application.

The following describes technical solutions of this application with reference to accompanying drawings.

A PHY circuit in this application is a circuit that is used to perform a function of a PHY defined by an Ethernet standard. The Ethernet standard may be an Ethernet standard released by Institute of Electrical and Electronics Engineers (IEEE). For example, the Ethernet standard may be IEEE 802.3-2015. For example, the function of the PHY may include a function of a PCS and a function of a physical medium attachment (PMA) sublayer.

A MAC circuit in this application is a circuit that is used to perform a function of MAC defined by the Ethernet standard. The Ethernet standard may be an Ethernet standard released by IEEE. For example, the Ethernet standard may be IEEE 802.3-2015. The function of the MAC is located at a data link layer. A function of logical link control (LLC) is also located at the data link layer.

In this application, the MAC circuit and the PHY circuit may communicate with each other through a MII. For example, the MII may be a ten gigabit MII (XGMII). In a possible design, the function of the PHY may further include a function of a reconciliation sublayer (RS). The MAC circuit may communicate with the PHY circuit through an RS circuit and the MII. The RS circuit is a circuit that is used to perform the function of the RS.

An Ethernet frame in this application includes a frame header, a payload, and an FCS field. The frame header starts from a destination MAC address field, and ends with an Ethertype field or a length field. The frame header includes neither a preamble field and nor a start of frame delimiter (SFD) field. The Ethernet frame includes neither a preamble field and nor a SFD field. The FCS field is used to perform CRC check on the Ethernet frame. A field other than the FCS field in the Ethernet frame is a parameter that needs to be used to calculate an FCS value of the Ethernet frame. When a calculated FCS value is not equal to a value of the FCS field, it is considered that an error occurs in the Ethernet frame. For a format of the Ethernet frame, refer to description in IEEE 802.3.

A fragment in this application is a fragment of the Ethernet frame. A block may be obtained after encoding processing is performed by the PHY on the Ethernet frame. The fragment in this application may be the block that is obtained after the encoding processing of the PHY. For example, the fragment may be a 64 bit data to a 66 bit data (64B/66B) block. In addition, when sending the Ethernet frame to the MAC circuit through the MII, the PHY circuit may send an RxC field and an RxD field to the MAC circuit through the MII. The fragment in this application may alternatively be the RxC field and the RxD field associated with the RxC field.

For meanings and specific implementations of technical terms in this application, refer to description in IEEE 802.3, for example, refer to description in IEEE 802.3-2015. The technical terms include but are not limited to a control character, a data character, a control octet, a data octet, a control code, a synchronization header (sync header) field, a 64B/66B block, a control block, a data block, a PCS receiver, a block type field, a receive control (RxC) field, and a receive data (RxD) field.

First, an Ethernet system 100 in this application is described. As shown in FIG. 1, the Ethernet system 100 includes a source device 101, a forwarding device 102, a forwarding device 103, and a destination device 104. The source device 101, the forwarding device 102, the forwarding device 103, and the destination device 104 are connected in series. A to-be-transmitted Ethernet frame is sent from the source device 101, and finally reaches the destination device 104 after passing through the forwarding device 102 and the forwarding device 103.

It should be noted that FIG. 1 shows only two forwarding devices the forwarding device 102 and the forwarding device 103. In a possible design, there may be at least three forwarding devices between the source device 101 and the destination device 104. A to-be-transmitted Ethernet frame is sent from the source device 101, and finally reaches the destination device 104 after being forwarded by the at least three forwarding devices.

As an example instead of a limitation, in this application, the Ethernet system 100 is applied to a cut-through forwarding application scenario. The following describes a cut-through technology with reference to the Ethernet system 100 in FIG. 1.

The source device 101 sends an Ethernet frame, and when receiving a part other than all of the Ethernet frame, the forwarding device 102 forwards the received part of the Ethernet frame. For example, the part of the Ethernet frame may be a fragment of the Ethernet frame. The forwarding device does not need to wait for the entire Ethernet frame for forwarding. In this solution, the Ethernet frame cuts through the forwarding device, and reaches the destination device 104 with a relatively small delay.

Figure 2:
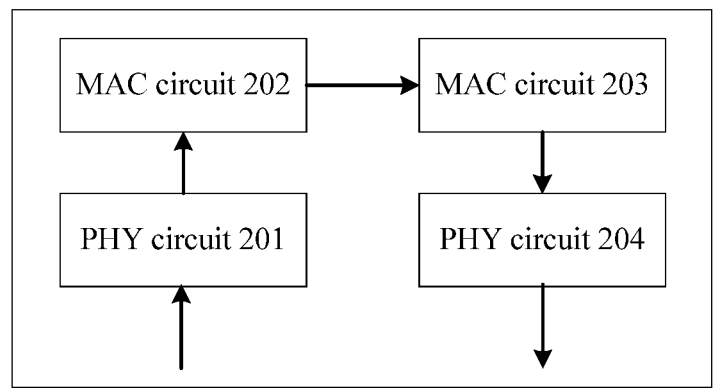
FIG. 2 is a possible schematic structural diagram of a forwarding device or a destination device according to an embodiment of this application.

FIG. 2 is a possible schematic structural diagram of the forwarding device 102 or the forwarding device 103 shown in FIG. 1.

The forwarding device includes a PHY circuit 201, a MAC circuit 202, a MAC circuit 203, and a PHY circuit 204. In a possible design, the PHY circuit 201 and the MAC circuit 202 may be included in a same chip. In another possible design, the PHY circuit 201 and the MAC circuit 202 may be included in different chips. In addition, the forwarding device may further include another component. For example, the forwarding device may further include a network processor (which is not shown in the figure). The network processor may be implemented using an application-specific integrated circuit (ASIC) or a field-programmable gate array (FPGA). In a possible design, a receiving port of the network processor is coupled to a sending port of the MAC circuit 202. A sending port of the network processor is coupled to a sending port of the MAC circuit 203. The network processor may obtain a destination MAC address from an Ethernet frame provided by the MAC circuit 202. The network processor may use the destination MAC address as a searching keyword, to search a MAC table for a sending port used to forward the Ethernet frame. For example, the sending port includes the MAC circuit 203 and the PHY circuit 204. Further, the network processor may provide the Ethernet frame for the MAC circuit 203 such that the PHY circuit 204 sends the Ethernet frame to a next-hop device.

The PHY circuit 201 and the MAC circuit 202 are used to receive a fragment sent by a neighboring device (for example, a source device or a forwarding device), and the MAC circuit 203 and the PHY circuit 204 are used to send a fragment received from the MAC circuit 202 to a next neighboring device (for example, a next-hop forwarding device or a destination device).

In this embodiment of this application, the PHY circuit 201 can send a received fragment to the MAC circuit 202 in two transport formats. The following separately describes the two transport formats.

Transport Format 1.

The PHY circuit 201 parses a received bit stream, and obtains, from the bit stream, a plurality of fragments that each include 66 bits. Each fragment that includes 66 bits includes a 2-bit synchronization header field (sync header field), a 1-byte block type field, and an n-byte (n>7) to-be-transmitted data. The 2-bit synchronization header field is used to indicate whether the n-byte to-be-transmitted data in the 66-bit fragment includes to-be-transmitted data with a type of control character, and the block type field is used to indicate a location of the to-be-transmitted data with the type of control character in the n-byte to-be-transmitted data. The fragment that includes 66 bits in this application may be a 64B/66B block. The to-be-transmitted data in this application may be an 8-bit data octet. The to-be-transmitted data in this application may alternatively be a 7-bit control character.

Before sending the 66-bit fragment to the MAC circuit 202, the PHY circuit 201 converts a format of the 66-bit fragment. Specifically, the 66-bit fragment is converted into a fragment that meets a format of an MIL The 66-bit fragment is converted into eight fragments after format conversion. Each fragment includes a 1-bit RxC field and an 8-bit RxD field. In addition, a value of an RxC field in each fragment indicates a type of an RxD field in the fragment. For example, the value of the RxC field can indicate that a type of the RxD field is a control character or a data character. The PHY circuit 201 transmits the eight fragments to the MAC circuit 202 using a serial or parallel transmission method.

Transport Format 2.

The PHY circuit 201 parses a received bit stream, and obtains, from the bit stream, a plurality of fragments that each include 66 bits. Each 66-bit fragment includes a 2-bit synchronization header field, a 1-byte block type field, and an n-byte to-be-transmitted data. The 2-bit synchronization header field is used to indicate whether the n-byte to-be-transmitted data in the 66-bit fragment includes to-be-transmitted data with a type of control character. The block type field is used to indicate a location of the to-be-transmitted data with the type of control character in the n-byte to-be-transmitted data.

Different from a scenario of the transport format 1, in a scenario of the transport format 2, the PHY circuit 201 directly sends the 66-bit fragment to the MAC circuit 202 instead of converting a format of the 66-bit fragment before sending the 66-bit fragment to the MAC circuit 202.

Figure 3:
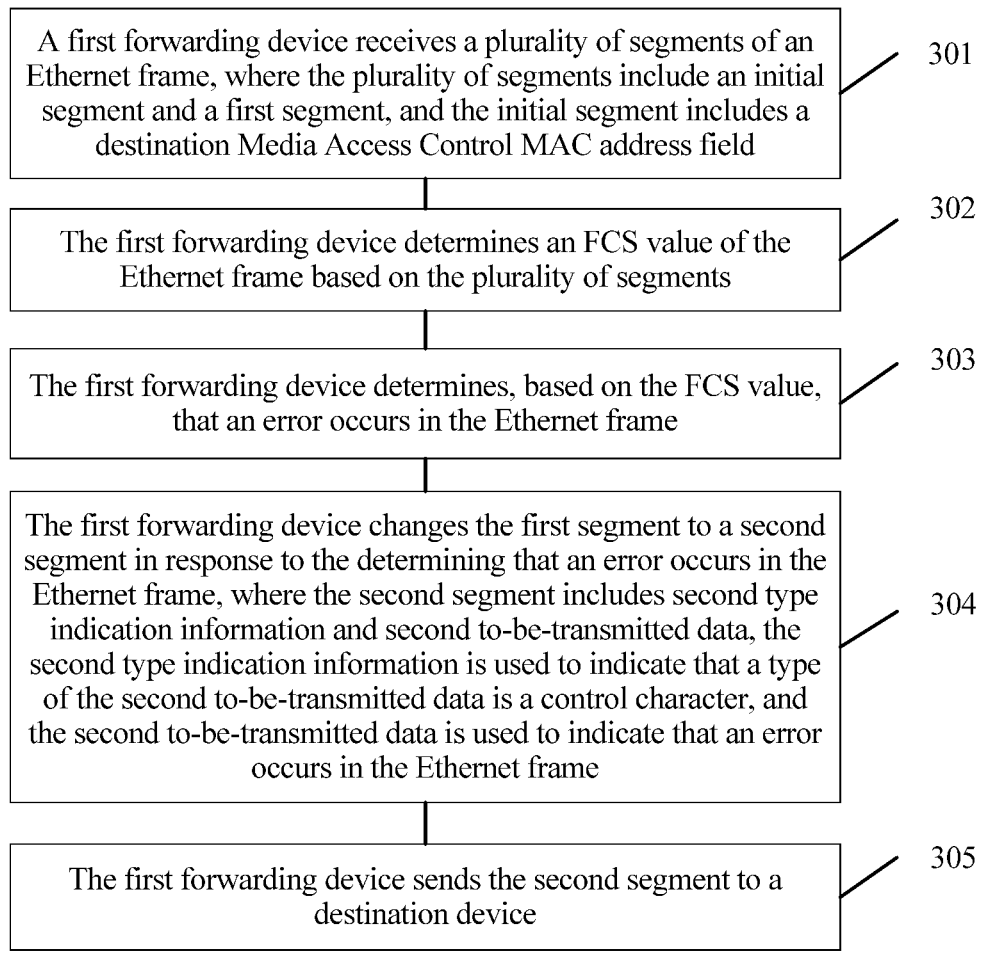
FIG. 3 is a schematic flowchart of a data transmission method according to an embodiment of this application.

FIG. 3 is a schematic flowchart of a data transmission method 300 according to an embodiment of this application, and the method includes 301 to 304. The method 300 may be performed by the forwarding device 102 shown in FIG. 1 or FIG. 2.

301. A first forwarding device receives a plurality of fragments of an Ethernet frame, where the plurality of fragments include an initial fragment and a first fragment, and the initial fragment includes a destination MAC address field.

For example, after generating an Ethernet frame, a source device 101 may send the Ethernet frame to the forwarding device 102 using a transmission medium. The Ethernet frame may be transmitted in the transmission medium in a form of a bit stream. A PHY circuit 201 in the forwarding device 102 may receive the bit stream using the transmission medium. The bit stream includes the plurality of fragments. The PHY circuit 201 may be located in an Ethernet receiving port of the forwarding device 102. The Ethernet receiving port may further include a MAC circuit 202. The transmission medium may be a cable or a fiber.

302. The first forwarding device determines an FCS value of the Ethernet frame based on the plurality of fragments.

Specifically, the PHY circuit 201 of the forwarding device 102 (for example, the first forwarding device) receives a plurality of fragments of an Ethernet frame sent by an upstream device (for example, the upstream device may be the source device 101 or another forwarding device located between the source device 101 and the forwarding device 102), and sends the plurality of fragments to the MAC circuit 202. The plurality of fragments include an initial fragment and a first fragment of the Ethernet frame. The first fragment is any fragment other than the initial fragment in the plurality of fragments. The initial fragment includes a destination MAC address field. A value of the destination MAC address field is equal to a MAC address of a destination device 104.

The MAC circuit 202 calculates an FCS value of the Ethernet frame based on the plurality of fragments received from the PHY circuit 201. The MAC circuit 202 may use a CRC algorithm to calculate the FCS value of the Ethernet frame. For example, the CRC algorithm may be a CRC32 algorithm.

It should be noted that in a cut-through application scenario, the plurality of fragments reach the MAC circuit 202 of the forwarding device 102 at different moments. When receiving the initial fragment in the plurality of fragments, the MAC circuit 202 may start to calculate the FCS value of the Ethernet frame. After the forwarding device 102 receives all fragments of the Ethernet frame (for example, the plurality of fragments), the MAC circuit 202 can complete calculation of the FCS value, to determine the FCS value of the Ethernet frame. It may be learned from the foregoing description that when calculating the FCS value of the Ethernet frame, the MAC circuit 202 needs to use all the fragments of the Ethernet frame. Each fragment participates in a calculation process of the FCS value, and provides a parameter for the calculation process of the FCS value.

After a fragment in the plurality of fragments provides a parameter for the calculation process of the FCS value, the MAC circuit 202 may forward the fragment. Alternatively, the MAC circuit 202 may first store the fragment, and then forward the fragment. The MAC circuit 202 may forward the fragment of the Ethernet frame according to a first in first out rule. In other words, a fragment that is received earlier needs to be forwarded before a fragment that is received later.

It should be noted that when the PHY circuit 201 sends the received fragments to the MAC circuit 202 in the foregoing transport format 1, the initial fragment in this embodiment of this application includes six RxC/RxD pairs. The RxC/RxD pair in this application is a signal including one RxC field and one RxD field. One RxC field includes 1 bit. One RxD field includes 8 bits. There is a correspondence relationship between the RxC field and the RxD field in the RxC/RxD pair. Specifically, the RxC field in the RxC/RxD pair is used to indicate a type of the RxD field in the RxC/RxD pair. Therefore, that the initial fragment includes six RxC/RxD pairs means that the initial fragment includes a 6-bit RxC field and a 6-byte RxD field. The 6-byte RxD field is used to carry the value of the destination MAC address field. Each of all other fragments different from the initial fragment includes one RxC/RxD pair.

It should be further noted that each of the plurality of fragments includes type indication information and to-be-transmitted data, and a value of the type indication information is used to indicate whether a type of the to-be-transmitted data is a control character.

303. The first forwarding device determines, based on the FCS value, that an error occurs in the Ethernet frame.

Specifically, the MAC circuit 202 determines, based on the FCS value of the Ethernet frame that is determined in 301, that an error occurs in the Ethernet frame in a transmission process. The Ethernet frame includes an FCS field. When the first forwarding device determines that the FCS value is not equal to a value of the FCS field, the first forwarding device may determine that an error occurs in the Ethernet frame.

It may be understood that after the source device 101 generates an Ethernet frame, an error may occur in the Ethernet frame due to interference in a process in which the Ethernet frame is transmitted from the source device 101 to the destination device 104. For example, electromagnetic interference may affect the Ethernet frame in the transmission process. That an error occurs in the Ethernet frame may be that a value/values of one or more bits included in the Ethernet frame is/are changed. For example, a value of a bit in the Ethernet frame is changed from 0 to 1, or a value of a bit in the Ethernet frame is changed from 1 to 0.

As an example instead of a limitation, the last fragment in the plurality of fragments of the Ethernet frame includes an FCS field, and the MAC circuit 202 compares the determined FCS value of the Ethernet frame with a value of the FCS field included in the last fragment.

If the FCS value is different from the value of the FCS field, the MAC circuit 202 determines that an error occurs in the Ethernet frame in the transmission process.

If the FCS value is the same as the value of the FCS field, the MAC circuit 202 determines that no error occurs in the Ethernet frame in the transmission process.

It should be further noted that when the MAC circuit 202 calculates the FCS value of the Ethernet frame based on the plurality of fragments received from the PHY circuit 201, the plurality of fragments do not include the last fragment.

304. The first forwarding device changes the first fragment to a second fragment in response to the determining that an error occurs in the Ethernet frame, where the second fragment includes second type indication information and second to-be-transmitted data, the second type indication information is used to indicate that a type of the second to-be-transmitted data is a control character, and the second to-be-transmitted data is used to indicate that an error occurs in the Ethernet frame.

The first fragment includes first type indication information and first to-be-transmitted data, the first type indication information is used to indicate a type of the first to-be-transmitted data, and a value of the first to-be-transmitted data is not equal to a value of the second to-be-transmitted data.

Specifically, when the MAC circuit 202 determines that an error occurs in the Ethernet frame in the transmission process, the MAC circuit 202 changes one fragment (for example, the first fragment) in at least two fragments that are not sent in the plurality of fragments, to obtain the second fragment.

Type indication information in the second fragment (for example, the second type indication information) indicates a type of to-be-transmitted data (for example, the second to-be-transmitted data) in the second fragment is a control character, the value of the second to-be-transmitted data in the second fragment is not equal to a value of to-be-transmitted data (for example, the first to-be-transmitted data) in the first fragment, and type indication information (for example, the first type indication information) in the first fragment is used to indicate that the type of the first to-be-transmitted data is a control character or data.

When a value of the first type indication information is not equal to a value of the second type indication information, in other words, the first type indication information indicates that the type of the first to-be-transmitted data is data, the MAC circuit 202 separately changes the first type indication information and the first to-be-transmitted data, changes the value of the first type indication information to the value of the second type indication information, and changes the value of the first to-be-transmitted data to the value of the second to-be-transmitted data, to obtain the second fragment, or when a value of the first type indication information is equal to a value of the second type indication information, in other words, the first type indication information indicates that the type of the first to-be-transmitted data is a control character, the MAC circuit 202 changes only the first to-be-transmitted data, and changes the value of the first to-be-transmitted data to the value of the second to-be-transmitted data, to obtain the second fragment.

305. The first forwarding device sends the second fragment to a destination device.

The value of the destination MAC address field is equal to a MAC address of the destination device, and the MAC address of the destination device is not equal to a MAC address of the first forwarding device.

Specifically, after obtaining the second fragment, the MAC circuit 202 may send the second fragment to a destination device 104. The destination MAC address is equal to a MAC address of the destination device 104, and the MAC address of the destination device 104 is not equal to a MAC address of the forwarding device 102. In a possible design, the first forwarding device sends the second fragment to the destination device using another forwarding device. The other forwarding device may be one forwarding device, or may be a plurality of forwarding devices. The other forwarding device does not change the second fragment. The other forwarding device transparently transmits the second fragment. In another possible design, the first forwarding device directly sends the second fragment to the destination device. The second fragment can reach the destination device without needing to pass through another forwarding device.

The MAC circuit 202 first sends the second fragment to a MAC circuit 203, the MAC circuit 203 sends the second fragment to a PHY circuit 204, and finally the PHY circuit 204 sends the second fragment to the destination device 104.

It should be noted that the first fragment is any fragment other than the initial fragment in the plurality of fragments of the Ethernet frame, for example, the first fragment is the last fragment in the plurality of fragments of the Ethernet frame. In this case, the first fragment includes the FCS field.

With reference to the foregoing two transport formats that are used by the PHY circuit 201 to send the first fragment to the MAC circuit 202, the following describes two cases in which the MAC circuit 202 changes the first fragment.

Case 1 is as follows.

When a format used by the PHY circuit 201 to send the first fragment to the MAC circuit 202 meets the foregoing transport format 1, the second fragment includes an RxC field and an RxD field. A value of the RxC field is used to carry the second type indication information, and a value of the RxD field is the second to-be-transmitted data.

As an example instead of a limitation, when the value of the RxC field is 0x0, it indicates that the to-be-transmitted data is a data octet. In other words, it indicates that a type of the to-be-transmitted data is a data character. When the value of the RxC field is 0x1, it indicates that the to-be-transmitted data is a control octet. In other words, it indicates that the type of the to-be-transmitted data is a control character. When a value of the RxD field is 0xFE, it indicates that an error occurs in the Ethernet frame in the transmission process.

For example, when the value of the first type indication information in the first fragment is 0, the MAC circuit 202 of the forwarding device 102 needs to change the value of the first type indication information to 1, and change the value of the first to-be-transmitted data to 0xFE, to obtain the second fragment. In other words, the value of the second type indication information of the second fragment is 1, and the value of the second to-be-transmitted data is 0xFE. Therefore, when receiving the second fragment, the destination device 104 determines, based on the value (0x1) of the RxC field in the second fragment, that the RxD field is a control octet, further checks the value (0xFE) of the data octet of the RxD field, and finally determines, based on the value of the data octet of the RxD field, that an error occurs in a new Ethernet frame in a transmission process.

For another example, when the value of the first type indication information in the first fragment is 1, the MAC circuit 202 of the forwarding device 102 needs to change only the value of the first to-be-transmitted data to 0xFE, to obtain the second fragment. In other words, the value of the second type indication information of the second fragment is 1, and the value of the second to-be-transmitted data is 0xFE. Therefore, when receiving the second fragment, the destination device 104 determines, based on the value (0x1) of the RxC field in the second fragment, that the RxD field is a control octet, further checks the value (0xFE) of the data octet of the RxD field, and finally determines, based on the value of the data octet of the RxD field, that an error occurs in a new Ethernet frame in a transmission process.

In this embodiment of this application, the second fragment is obtained after the first type indication information and/or the first to-be-transmitted data in the first fragment are/is changed such that a next forwarding device determines, based on the second fragment, that an error occurs in the Ethernet frame in the transmission process.

It should be noted that the destination device 104 may further check the value of the second to-be-transmitted data only when the type of the second to-be-transmitted data that is indicated by the value of the second type indication information in the second fragment is a control character, and may determine, based on the value of the second to-be-transmitted data, that an error occurs in the Ethernet frame in the transmission process. Therefore, when the type of the second to-be-transmitted data that is indicated by the value of the second type indication information is data, the MAC circuit 202 needs to change both the value of the second type indication information and the value of the second to-be-transmitted data, or when the type of the second to-be-transmitted data that is indicated by the value of the second type indication information is a control character, the MAC circuit 202 needs to change only the value of the second to-be-transmitted data.

Case 2 is as follows.

When a format used by the PHY circuit 201 to send the first fragment to the MAC circuit 202 meets the foregoing transport format 2, the second fragment includes a synchronization header field, a block type field, and n-byte (n>7) to-be-transmitted data. The n-byte to-be-transmitted data includes the second to-be-transmitted data, the second type indication information includes the synchronization header field and the block type field, the second type indication information is used to indicate that the type of the second to-be-transmitted data is a control character, and the second type indication information is further used to indicate a location of the second to-be-transmitted data in the n-byte to-be-transmitted data.

Specifically, a format of the first fragment received by the MAC circuit 202 from the PHY circuit 201 meets the foregoing transport format 2. In other words, the second fragment includes a 2-bit synchronization header field, a 1-byte block type field, and n-byte to-be-transmitted data. The second type indication information is used to indicate that the type of the second to-be-transmitted data is a control character, and the second type indication information is further used to indicate the location of the second to-be-transmitted data in the n-byte to-be-transmitted data. A specific implementation is as follows. The synchronization header field indicates whether the n-byte to-be-transmitted data includes to-be-transmitted data with a type of control character, and the block type field is used to indicate a location of the second to-be-transmitted data in the n-byte to-be-transmitted data.

Figure 7:
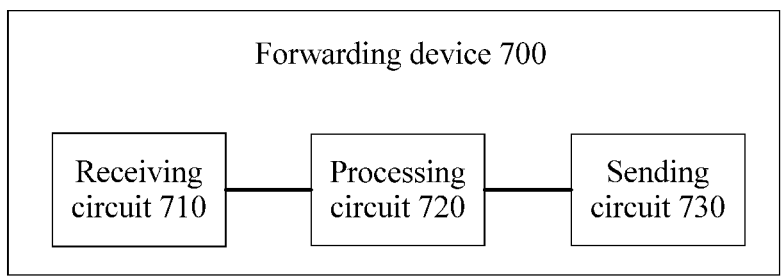
FIG. 7 is a schematic block diagram of a forwarding device according to an embodiment of this application.

It should be noted that for a correspondence among a value of the synchronization header field, a value of the block type field, and a value of the n-byte to-be-transmitted data, refer to FIG. 49-7 of section 49.2.4.4 in the Ethernet standard IEEE 802.3-2015.

As an example instead of a limitation, it may be seen from the figure that when the value of the synchronization header field is 01, it indicates that there is 8-byte to-be-transmitted data behind the synchronization header field, each of the 8-byte to-be-transmitted data is a data octet, and the eight data octets are respectively $D_0$-$D_7$, when the value of the synchronization header field is 10, and the value of the block type field is 0x1E, it indicates that there is 8-byte to-be-transmitted data behind the block type field, each of the 8-byte to-be-transmitted data is a control code, the eight control codes are respectively $C_0$-$C_7$, and when a value of any control code in $C_0$-$C_7$ is 0x1E, it indicates that an error occurs in the Ethernet frame in the transmission process, when the value of the synchronization header field is 10, and the value of the block type field is 0x33, it indicates that there is 8-byte to-be-transmitted data behind the block type field, the 8-byte to-be-transmitted data includes four control codes and three data octets, the four control codes are respectively $C_0$-$C_3$, the three data octets are respectively $D_5$-$D_7$, and when a value of any control code in $C_0$-$C_3$ is 0x1E, it indicates that an error occurs in the Ethernet frame in the transmission process.

For example, when the value of the synchronization header field in the first fragment is 01, the MAC circuit 202 of the forwarding device 102 needs to change the value of the first type indication information to 10, and change $D_3$ in the eight data octets $D_0$-$D_7$ behind the synchronization header field to the control code $C_3$ to obtain the second fragment, and a value of the control code $C_3$ is 0x1E. In other words, a value of the synchronization header field of the second fragment is 10, the eight pieces of to-be-transmitted data behind the synchronization header field are respectively $D_0$, $D_1$, $D_2$, $C_3$, $D_4$, $D_5$, $D_6$, and $D_7$, and $C_3$ is the second to-be-transmitted data. Therefore, when receiving the second fragment, the destination device 104 determines, based on the value (10) of the synchronization header field in the second fragment, that the eight pieces of to-be-transmitted data behind the synchronization header field include the control code, and further checks the value (0x1E) of the control code, to finally determine, based on the value of the control code, that an error occurs in a new Ethernet frame in the transmission process.

In this application, the source device generates an Ethernet frame, and sends the Ethernet frame to the destination device using at least one forwarding device. The forwarding device performs CRC check on the received Ethernet frame, to determine that an error occurs in the Ethernet frame. The forwarding device changes the received Ethernet frame. A changed Ethernet frame includes the second fragment. An Ethernet frame received by the destination device is different from the Ethernet frame generated by the source device. In this application, the Ethernet frame received by the destination device is referred to as a new Ethernet frame, to differentiate between different objects.

For another example, when the value of the synchronization header field in the first fragment is 10, the MAC circuit 202 of the forwarding device 102 needs to change only a value of any one in $C_0$-$C_3$ or $D_5$-$D_7$ that are behind the block type field to 0x1E (for example, a value of $C_2$ in $C_0$-$C_3$ is changed to 0x1E, or $D_6$ in $D_5$-$D_7$ is changed to the control code $C_6$), to obtain the second fragment. In other words, the value of the synchronization header field of the second fragment is 10, the value of $C_2$ in the eight pieces of to-be-transmitted data behind the synchronization header field is 0x1E, values of other to-be-transmitted data are kept unchanged, and $C_2$ is the second to-be-transmitted data. Therefore, when receiving the second fragment, the destination device 104 determines, based on the value (10) of the synchronization header field in the second fragment, that the eight pieces of to-be-transmitted data behind the synchronization header field include the control code, determines, based on the value 0x33 of the block type field, that to-be-transmitted data on $C_0$-$C_3$ behind the block type field is a control code, and further checks the value (0x1E) of the control code, to finally determine, based on the value of the control code, that an error occurs in a new Ethernet frame in the transmission process.

It should be noted that because the block type field is used to indicate a location of the control code in the 8-byte to-be-transmitted data behind the block type field, when $D_6$ in $D_5$-$D_7$ is changed to the control code $C_6$, the value of the block type field also needs to be changed correspondingly.

It should be further noted that the foregoing new Ethernet frame is an Ethernet frame that includes the second fragment and the plurality of fragments except the first fragment.

In this embodiment of this application, the second fragment is obtained after the first type indication information and/or the first to-be-transmitted data in the first fragment are/is changed such that a next forwarding device determines, based on the second fragment, that an error occurs in the Ethernet frame in the transmission process.

It should be noted that the destination device 104 may further check the value of the second to-be-transmitted data only when the type of the second to-be-transmitted data that is indicated by the value of the second type indication information in the second fragment is a control character, and may determine, based on the value of the second to-be-transmitted data, that an error occurs in the Ethernet frame in the transmission process. Therefore, when the type of the second to-be-transmitted data that is indicated by the value of the second type indication information is data, the MAC circuit 202 needs to change both the value of the second type indication information and the value of the second to-be-transmitted data, or when the type of the second to-be-transmitted data that is indicated by the value of the second type indication information is a control character, the MAC circuit 202 needs to change only the value of the second to-be-transmitted data.

The following describes a detailed process in which the destination device 104 determines that an error occurs in a new Ethernet frame in case 1 and case 2.

The destination device 104 receives the second fragment and fragments other than the first fragment in the plurality of fragments, the destination device 104 determines, based on the second fragment, that an error occurs in a new Ethernet frame, where the new Ethernet frame includes the second fragment and the fragments other than the first fragment in the plurality of fragments, and the destination device 104 discards the new Ethernet frame in response to the determining that an error occurs in the Ethernet frame.

As an example instead of a limitation, the PHY circuit 201 of the destination device 104 includes a PCS receiver, and that the destination device determines, based on the second fragment, that an error occurs in the new Ethernet frame includes the following.

The destination device 104 responds to the second to-be-transmitted data in the second fragment, the PCS receiver of the PHY circuit 201 enters an RX_E state, and the PCS receiver of the PHY circuit 201 that is in the RX_E state sends a signal to the MAC circuit 202.

The signal includes an RxC field with a value of 1 and an RxD field with a value of 0xFE, and the MAC circuit 202 determines, based on the value of the RxC field and the value of the RxD field in the signal, that an error occurs in the new Ethernet frame, or the signal includes a synchronization header field with a value of 10, a block type field with a value of 0x33, and $C_0$-$C_3$ and $D_5$-$D_7$, a value of $C_2$ is 0x1E, and the MAC circuit 202 determines, based on the value of the synchronization header field, the value of the block type field, and the value of $C_2$ that are in the signal, that an error occurs in the new Ethernet frame.

As an example instead of a limitation, that the destination device 104 discards the new Ethernet frame in response to the determining that an error occurs in the new Ethernet frame includes the following.

The MAC circuit 202 in the destination device 104 discards the new Ethernet frame.

It should be noted that when the forwarding device 102 and the destination device 104 are adjacent, in other words, when there is no forwarding device between the forwarding device 102 and the destination device 104, the changed fragment is directly sent by the forwarding device 102 to the destination device 104, or when there is another forwarding device between the forwarding device 102 and the destination device 104, the second fragment is first sent by the forwarding device 102 to the forwarding device behind the forwarding device 102, and then the forwarding device behind the forwarding device 102 (for example, a forwarding device 103) sends the second fragment to the destination device 104.

The following describes a method 400 in which the forwarding device 103 sends, to the destination device 104, a plurality of fragments of the Ethernet frame received from the forwarding device 102.

Figure 4:
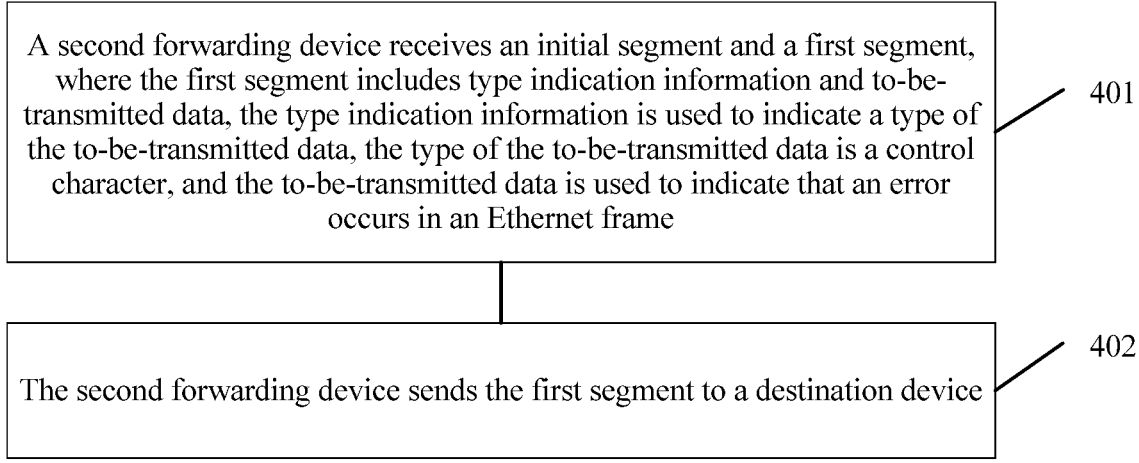
FIG. 4 is another schematic flowchart of a data transmission method according to an embodiment of this application.

FIG. 4 is a schematic flowchart of a data transmission method 400 according to an embodiment of this application, and the method includes 401 and 402. The method 400 may be performed by the forwarding device 103 shown in FIG. 1 or FIG. 2.

401. A second forwarding device receives an initial fragment and a first fragment, where the first fragment includes type indication information and to-be-transmitted data, the type indication information is used to indicate a type of the to-be-transmitted data, the type of the to-be-transmitted data is a control character, and the to-be-transmitted data is used to indicate that an error occurs in an Ethernet frame.

The Ethernet frame includes the initial fragment, the initial fragment includes a destination MAC address field, a value of the destination MAC address field is equal to a MAC address of a destination device, and a MAC address of the second forwarding device is not equal to the value of the destination MAC address field.

For example, the second forwarding device includes an Ethernet receiving port. The Ethernet receiving port includes a PHY circuit. The second forwarding device may use the PHY circuit that is included in the Ethernet receiving port to receive the initial fragment and the first fragment. For a specific implementation of 401, refer to description of 301 in the embodiment shown in FIG. 3. Details are not described herein again.

Specifically, a PHY circuit 201 of the forwarding device 103 (for example, the second forwarding device) receives a changed fragment (for example, the first fragment) that is sent by a PHY circuit 204 of the forwarding device 102 in the method 300, and sends the changed fragment to a MAC circuit 202 of the forwarding device 103. The changed fragment includes type indication information and to-be-transmitted data, the type indication information is used to indicate that a type of the to-be-transmitted data is a control character, and the to-be-transmitted data is used to indicate that an error occurs in an Ethernet frame in a transmission process. The Ethernet frame includes the initial fragment, the initial fragment includes a destination MAC address field, a value of the destination MAC address field is equal to a MAC address of a destination device 104, and a MAC address of the forwarding device 103 is not equal to the value of the destination MAC address field.

402. The second forwarding device sends the first fragment to a destination device.

For example, the second forwarding device includes an Ethernet sending port. For a specific implementation of 402, refer to description of 305 in the embodiment shown in FIG. 3. Details are not described herein again.

As an example instead of a limitation, after the forwarding device 103 receives the initial fragment and the first fragment, and before the forwarding device 103 sends the first fragment to the destination device 104, the method 400 further includes the following.

The forwarding device 103 determines, based on the destination MAC address field, that the MAC address of the forwarding device 103 is not equal to the value of the destination MAC address field.

That the forwarding device 103 sends the first fragment to the destination device 104 includes the following.

In response to the determining that the MAC address of the forwarding device 103 is not equal to the value of the destination MAC address field, the forwarding device 103 sends the first fragment to the destination device 104.

Specifically, before sending the first fragment to the destination device 104, the forwarding device 103 determines that the MAC address of the forwarding device 103 is not equal to the value of the destination MAC address field included in the initial fragment, further determines that the forwarding device 103 is not the destination device, and determines to send the first fragment to the destination device 104.

As an example instead of a limitation, the Ethernet frame further includes a second fragment, and before the forwarding device 103 receives the first fragment, in response to determining, after CRC check is performed on the Ethernet frame, that an error occurs in the Ethernet frame, the second fragment is changed to the first fragment.

Specifically, the Ethernet frame further includes the second fragment. When the forwarding device 102 determines that an error occurs in the Ethernet frame, in response to the determining, after CRC check is performed on the Ethernet frame, that an error occurs in the Ethernet frame, the forwarding device 102 changes the second fragment to the first fragment, and sends the first fragment to the forwarding device 103.

As an example instead of a limitation, the PHY circuit 201 of the forwarding device 103 includes a PCS receiver. After the PHY circuit 201 of the forwarding device 103 receives the first fragment, in response to the to-be-transmitted data in the first fragment, the PCS receiver enters an RX_E state. Further, the PHY circuit 201 may determine that an error occurs in the Ethernet frame in the transmission process.

As an example instead of a limitation, the first fragment includes an RxC field and an RxD field, the RxC field carries the type indication information, and the RxD field carries the to-be-transmitted data.

As an example instead of a limitation, a value of the RxC field is equal to 1, and a value of the RxD field is equal to 0xFE.

As an example instead of a limitation, the first fragment includes a synchronization header field, a block type field, and a plurality of pieces of to-be-transmitted data, the plurality of pieces of to-be-transmitted data include the to-be-transmitted data, and the synchronization header field and the block type field carry the type indication information.

As an example instead of a limitation, a value of the synchronization header field is equal to 0x10, and a value of the to-be-transmitted data is equal to 0x1E.

As an example instead of a limitation, to-be-transmitted data in the second fragment includes an FCS field of the Ethernet frame, or the second fragment does not include an FCS field of the Ethernet frame.

With reference to FIG. 1 to FIG. 4, the foregoing describes the data transmission method provided in the embodiments of this application. With reference to FIG. 5 to FIG. 8, the following describes a forwarding apparatus, a forwarding device, a destination apparatus, and a destination device provided in the embodiments of this application.

Figure 5:
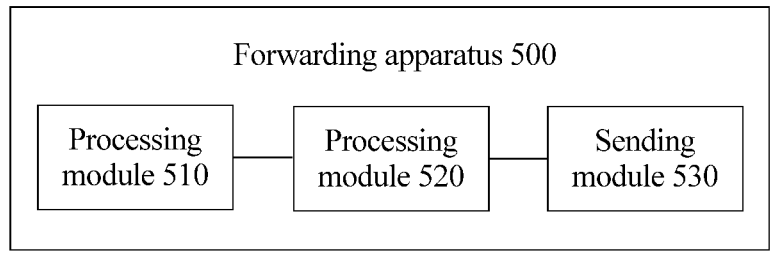
FIG. 5 is a schematic block diagram of a forwarding apparatus according to an embodiment of this application.

FIG. 5 is a schematic block diagram of a forwarding apparatus 500 according to an embodiment of this application. The forwarding apparatus 500 includes a receiving module 510, a processing module 520, and a sending module 530.

For example, the forwarding apparatus 500 may be the forwarding device 102 shown in FIG. 1 or FIG. 2. The forwarding apparatus 500 may be configured to perform the method shown in FIG. 3. For a specific implementation of the forwarding apparatus 500, refer to description of the embodiment corresponding to FIG. 3. Details are not described herein again.

The receiving module 510 is configured to receive a plurality of fragments of an Ethernet frame, where the plurality of fragments include an initial fragment and a first fragment, and the initial fragment includes a destination MAC address field.

For example, the receiving module 510 may be configured to perform 301. For a specific implementation of the receiving module 510, refer to description of 301 in the embodiment corresponding to FIG. 3.

The processing module 520 is configured to determine an FCS value of the Ethernet frame based on the plurality of fragments, determine, based on the FCS value, that an error occurs in the Ethernet frame, and change the first fragment to a second fragment in response to the determining that an error occurs in the Ethernet frame, where the first fragment includes first type indication information and first to-be-transmitted data, the second fragment includes second type indication information and second to-be-transmitted data, the first type indication information is used to indicate a type of the first to-be-transmitted data, the second type indication information is used to indicate that a type of the second to-be-transmitted data is a control character, a value of the first to-be-transmitted data is not equal to a value of the second to-be-transmitted data, and the second to-be-transmitted data is used to indicate that an error occurs in the Ethernet frame.

For example, the processing module 520 may be configured to perform 302, 303, and 304. For a specific implementation of the processing module 520, refer to description of 302, 303, and 304 in the embodiment corresponding to FIG. 3.

The sending module 530 is configured to send the second fragment to a destination device, where a value of the destination MAC address field is equal to a MAC address of the destination device, and the MAC address of the destination device is not equal to a MAC address of the forwarding device.

For example, the sending module 530 may be configured to perform 305. For a specific implementation of the sending module 530, refer to description of 305 in the embodiment corresponding to FIG. 3.

Optionally, the processing module 520 is configured to respectively change the first type indication information and the first to-be-transmitted data in the first fragment to the second type indication information and the second to-be-transmitted data when a value of the first type indication information is not equal to a value of the second type indication information, or change the first to-be-transmitted data in the first fragment to the second to-be-transmitted data when a value of the first type indication information is equal to a value of the second type indication information.

Optionally, the second fragment includes an RxC field and an RxD field, the RxC field carries the second type indication information, and the RxD field carries the second to-be-transmitted data.

Optionally, a value of the RxC field is 1, and a value of the RxD field is equal to 0xFE.

Optionally, the second fragment includes a synchronization header field, a block type field, and a plurality of pieces of to-be-transmitted data, the plurality of pieces of to-be-transmitted data include the second to-be-transmitted data, the second type indication information includes the synchronization header field and the block type field, the second type indication information is used to indicate that the type of the second to-be-transmitted data is a control character, and the second type indication information is further used to indicate a location of the second to-be-transmitted data in the plurality of pieces of to-be-transmitted data.

Optionally, the value of the second to-be-transmitted data is equal to 0x1E.

Optionally, the to-be-transmitted data in the first fragment includes an FCS field, or the first fragment does not include a FCS field.

Optionally, the processing module 520 is configured to, when the FCS value is not equal to a value of the FCS field, determine that an error occurs in the Ethernet frame.

It should be understood that the processing module 520 in this embodiment of the present application may be implemented by a processor or a circuit component related to the processor, and the receiving module 510 and the sending module 530 may be implemented by a transceiver or a circuit component related to the transceiver.

Figure 6:
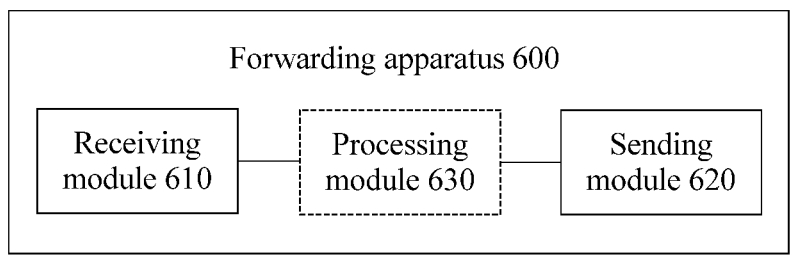
FIG. 6 is another schematic block diagram of a forwarding apparatus according to an embodiment of this application.

FIG. 6 is a schematic block diagram of a forwarding apparatus 600 according to an embodiment of this application. The forwarding apparatus 600 includes a receiving module 610 and a sending module 620.

For example, the forwarding apparatus 600 may be the forwarding device 103 shown in FIG. 1 or FIG. 2. The forwarding apparatus 600 may be configured to perform the method shown in FIG. 4. For a specific implementation of the forwarding apparatus 600, refer to description of the embodiment corresponding to FIG. 4. Details are not described herein again.

The receiving module 610 is configured to receive an initial fragment and a first fragment, where the first fragment includes type indication information and to-be-transmitted data, the type indication information is used to indicate a type of the to-be-transmitted data, the type of the to-be-transmitted data is a control character, the to-be-transmitted data is used to indicate that an error occurs in an Ethernet frame, the Ethernet frame includes the initial fragment, the initial fragment includes a destination MAC address field, a value of the destination MAC address field is equal to a MAC address of a destination device, and a MAC address of the forwarding device is not equal to the value of the destination MAC address field.

For example, the receiving module 610 may be configured to perform 401. For a specific implementation of the receiving module 610, refer to description of 401 in the embodiment corresponding to FIG. 4.

The sending module 620 is configured to send the first fragment to the destination device.

For example, the sending module 620 may be configured to perform 402. For a specific implementation of the sending module 620, refer to description of 402 in the embodiment corresponding to FIG. 4.

Optionally, the Ethernet frame further includes a second fragment, and before the forwarding device receives the first fragment, in response to determining, after CRC check is performed on the Ethernet frame, that an error occurs in the Ethernet frame, the second fragment is changed to the first fragment.

Optionally, the forwarding apparatus 600 further includes a processing module 630, and the processing module 630 is configured to, after the receiving module 610 receives the initial fragment and the first fragment, and before the sending module 620 sends the first fragment to the destination device, determine, based on the destination MAC address field, that the MAC address of the forwarding device is not equal to the value of the destination MAC address field, and the sending module 620 is configured to, in response to the determining that the MAC address of the forwarding device is not equal to the value of the destination MAC address field, send the first fragment to the destination device.

Optionally, the receiving module 610 includes a PCS receiver, and the PCS receiver is configured to, after the receiving module 610 receives the first fragment, in response to the to-be-transmitted data, the PCS receiver enters an RX_E state.

Optionally, the first fragment includes an RxC field and an RxD field, the RxC field carries the type indication information, and the RxD field carries the to-be-transmitted data.

Optionally, a value of the RxC field is equal to 1, and a value of the RxD field is equal to 0xFE.

Optionally, the first fragment includes a synchronization header field, a block type field, and a plurality of pieces of to-be-transmitted data, the plurality of pieces of to-be-transmitted data include the to-be-transmitted data, the type indication information includes the synchronization header field and the block type field, the type indication information is used to indicate that the type of the to-be-transmitted data is a control character, and the type indication information is further used to indicate a location of the to-be-transmitted data in the plurality of pieces of to-be-transmitted data.

Optionally, a value of the synchronization header field is equal to 0x10, and a value of the to-be-transmitted data is equal to 0x1E.

Optionally, to-be-transmitted data in the second fragment includes an FCS field of the Ethernet frame, or the second fragment does not include a an FCS field of the Ethernet frame.

It should be understood that the processing module 630 in this embodiment of the present application may be implemented by a processor or a circuit component related to the processor, and the receiving module 610 and the sending module 620 may be implemented by a transceiver or a circuit component related to the transceiver.

FIG. 7 is a schematic block diagram of a forwarding device 700 according to an embodiment of this application. The forwarding device 700 includes a receiving circuit 710, a processing circuit 720, and a sending circuit 730.

For example, the forwarding device 700 may be the forwarding device 102 shown in FIG. 1 or FIG. 2. The forwarding device 700 may be configured to perform the method shown in FIG. 3. For a specific implementation of the forwarding device 700, refer to description of the embodiment corresponding to FIG. 3. Details are not described herein again.

The receiving circuit 710 is configured to receive a plurality of fragments of an Ethernet frame, where the plurality of fragments include an initial fragment and a first fragment, and the initial fragment includes a destination MAC address field.

For example, the receiving circuit 710 may be configured to perform 301. For a specific implementation of the receiving circuit 710, refer to description of 301 in the embodiment corresponding to FIG. 3.

The processing circuit 720 is configured to determine a FCS value of the Ethernet frame based on the plurality of fragments, determine, based on the FCS value, that an error occurs in the Ethernet frame, and change the first fragment to a second fragment in response to the determining that an error occurs in the Ethernet frame, where the first fragment includes first type indication information and first to-be-transmitted data, the second fragment includes second type indication information and second to-be-transmitted data, the first type indication information is used to indicate a type of the first to-be-transmitted data, the second type indication information is used to indicate that a type of the second to-be-transmitted data is a control character, a value of the first to-be-transmitted data is not equal to a value of the second to-be-transmitted data, and the second to-be-transmitted data is used to indicate that an error occurs in the Ethernet frame.

For example, the processing circuit 720 may be configured to perform 302, 303, and 304. For a specific implementation of the processing circuit 720, refer to description of 302, 303, and 304 in the embodiment corresponding to FIG. 3.

The sending circuit 730 is configured to send the second fragment to a destination device, where a value of the destination MAC address field is equal to a MAC address of the destination device, and the MAC address of the destination device is not equal to a MAC address of the forwarding device.

For example, the sending circuit 730 may be configured to perform 305. For a specific implementation of the sending circuit 730, refer to description of 305 in the embodiment corresponding to FIG. 3.

Optionally, the processing circuit 720 is configured to respectively change the first type indication information and the first to-be-transmitted data in the first fragment to the second type indication information and the second to-be-transmitted data when a value of the first type indication information is not equal to a value of the second type indication information, or change the first to-be-transmitted data in the first fragment to the second to-be-transmitted data when a value of the first type indication information is equal to a value of the second type indication information.

Optionally, the second fragment includes an RxC field and an RxD field, the RxC field carries the second type indication information, and the RxD field carries the second to-be-transmitted data.

Optionally, a value of the RxC field is 1, and a value of the RxD field is equal to 0xFE.

Optionally, the second fragment includes a synchronization header field, a block type field, and a plurality of pieces of to-be-transmitted data, the plurality of pieces of to-be-transmitted data include the second to-be-transmitted data, the second type indication information includes the synchronization header field and the block type field, the second type indication information is used to indicate that the type of the second to-be-transmitted data is a control character, and the second type indication information is further used to indicate a location of the second to-be-transmitted data in the plurality of pieces of to-be-transmitted data.

Optionally, the value of the second to-be-transmitted data is equal to 0x1E.

Optionally, the to-be-transmitted data in the first fragment includes an FCS field, or the first fragment does not include an FCS field.

Optionally, the processing circuit 720 is configured to, when the FCS value is not equal to a value of the FCS field, determine that an error occurs in the Ethernet frame.

Figure 8:
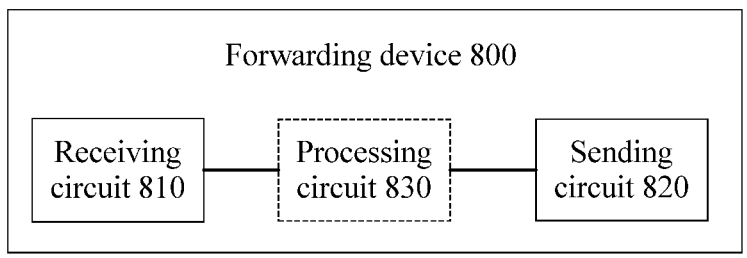
FIG. 8 is another schematic block diagram of a forwarding device according to an embodiment of this application.

FIG. 8 is a schematic block diagram of a forwarding device 800 according to an embodiment of this application. The forwarding device 800 includes a receiving circuit 810 and a sending circuit 820

For example, the forwarding device 800 may be the forwarding device 103 shown in FIG. 1 or FIG. 2. The forwarding device 800 may be configured to perform the method shown in FIG. 4. For a specific implementation of the forwarding device 800, refer to description of the embodiment corresponding to FIG. 4. Details are not described herein again.

The receiving circuit 810 is configured to receive an initial fragment and a first fragment, where the first fragment includes type indication information and to-be-transmitted data, the type indication information is used to indicate a type of the to-be-transmitted data, the type of the to-be-transmitted data is a control character, the to-be-transmitted data is used to indicate that an error occurs in an Ethernet frame, the Ethernet frame includes the initial fragment, the initial fragment includes a destination MAC address field, a value of the destination MAC address field is equal to a MAC address of a destination device, and a MAC address of the forwarding device is not equal to the value of the destination MAC address field.

For example, the receiving circuit 810 may be configured to perform 401. For a specific implementation of the receiving circuit 810, refer to description of 401 in the embodiment corresponding to FIG. 4.

The sending circuit 820 is configured to send the first fragment to the destination device.

For example, the sending circuit 820 may be configured to perform 402. For a specific implementation of the sending circuit 820, refer to description of 402 in the embodiment corresponding to FIG. 4.

Optionally, the Ethernet frame further includes a second fragment, and before the forwarding device receives the first fragment, in response to determining, after CRC check is performed on the Ethernet frame, that an error occurs in the Ethernet frame, the second fragment is changed to the first fragment.

Optionally, the forwarding apparatus 800 further includes the processing circuit 830, and the processing circuit 830 is configured to, after the receiving circuit 810 receives the initial fragment and the first fragment, and before the sending circuit 820 sends the first fragment to the destination device, determine, based on the destination MAC address field, that the MAC address of the forwarding device is not equal to the value of the destination MAC address field, and the sending circuit 820 is configured to, in response to the determining that the MAC address of the forwarding device is not equal to the value of the destination MAC address field, send the first fragment to the destination device.

Optionally, the receiving circuit 810 includes a PCS receiver, and the PCS receiver is configured to, after the receiving circuit 810 receives the first fragment, in response to the to-be-transmitted data, the PCS receiver enters an RX_E state.

Optionally, the first fragment includes an RxC field and an RxD field, the RxC field carries the type indication information, and the RxD field carries the to-be-transmitted data.

Optionally, a value of the RxC field is equal to 1, and a value of the RxD field is equal to 0xFE.

Optionally, the first fragment includes a synchronization header field, a block type field, and a plurality of pieces of to-be-transmitted data, the plurality of pieces of to-be-transmitted data include the to-be-transmitted data, the type indication information includes the synchronization header field and the block type field, the type indication information is used to indicate that the type of the to-be-transmitted data is a control character, and the type indication information is further used to indicate a location of the to-be-transmitted data in the plurality of pieces of to-be-transmitted data.

Optionally, a value of the synchronization header field is equal to 0x10, and a value of the to-be-transmitted data is equal to 0x1E.

Optionally, to-be-transmitted data in the second fragment includes an FCS field of the Ethernet frame, or the second fragment does not include an FCS field of the Ethernet frame.

It should be understood that the processor in the embodiments of the present application may be a central processing unit (CPU), and may also be another general purpose processor, a digital signal processor (DSP), an ASIC, an FPGA, or another programmable logic device, a discrete gate or transistor logic device, a discrete hardware component, or the like. The general purpose processor may be a microprocessor, or the processor may be any conventional processor or the like.

It may be understood that the memory mentioned in the embodiments of the present application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. By way of an example but not restrictive description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct Rambus RAM (DR RAM).

It should be noted that when the processor is a general purpose processor, a DSP, an ASIC, an FPGA, or another programmable logic device, a discrete gate or transistor logic device, or a discrete hardware component, the memory (storage module) is integrated in the processor.

It should be noted that the memory described in this specification is intended to include but is not limited to these memories and a memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or a combination of computer software and circuit hardware depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

What is claimed is:

1. A method, implemented by a forwarding device, comprising:
   receiving a plurality of fragments of an Ethernet frame, wherein the fragments comprise an initial fragment and a first fragment, and wherein the initial fragment comprises a destination media access control (MAC) address field;
   changing the first fragment to a second fragment in response to an error occurring in the Ethernet frame, wherein the first fragment comprises first type indication information and first to-be-transmitted data, wherein the first type indication information indicates a first type of the first to-be-transmitted data, wherein the second fragment comprises second type indication information and second to-be-transmitted data, wherein the second type indication information indicates that a second type of the second to-be-transmitted data is a control character, wherein a first value of the first to-be-transmitted data is not equal to a second value of the second to-be-transmitted data, and wherein the second to-be-transmitted data indicates the error; and
   sending the second fragment to a destination device, wherein the destination MAC address field is equal to a first MAC address of the destination device, and wherein the first MAC address is not equal to a second MAC address of the network device.

2. The method of claim 1, further comprising:
   changing, by the forwarding device, the first type indication information and the first to-be-transmitted data to the second type indication information and the second to-be-transmitted data when a fourth value of the first type indication information is not equal to a fifth value of the second type indication information; and
   changing the first to-be-transmitted data in the first fragment to the second to-be-transmitted data when the fourth value is equal to the fifth value.

3. The method of claim 1, wherein the second fragment comprises a receive control (RxC) field and a receive data (RxD) field, wherein the RxC field carries the second type indication information, and wherein the RxD field carries the second to-be-transmitted data.

4. The method of claim 3, wherein a sixth value of the RxC field is 1, and wherein a seventh value of the RxD field is equal to 0xFE.

5. The method of claim 1, wherein the second fragment comprises a synchronization header field, a block type field, and a plurality of pieces of to-be-transmitted data, wherein the pieces comprise the second to-be-transmitted data, wherein the second type indication information comprises the synchronization header field and the block type field, and wherein the second type indication information indicates a location of the second to-be-transmitted data in the pieces.

6. The method of claim 5, wherein the second value is equal to 0x1E.

7. The method of claim 1, wherein the first to-be-transmitted data in the first fragment comprises a frame check sequence (FCS) field.

8. The method of claim 7, further comprising:
   determining, by the forwarding device, an FCS value of the Ethernet frame based on the fragments; and
   determining that the error occurs in the Ethernet frame based on the FCS value.

9. The method of claim 8, further comprising determining that the error occurs in the Ethernet frame when the FCS value is not equal to an eighth value of the FCS field.

10. A method implemented by a network device, comprising:
    receiving an initial fragment and a first fragment, wherein the first fragment comprises type indication information and to-be-transmitted data, wherein the type indication information indicates a first type of the to-be-transmitted data, wherein the first type is a control character, wherein the to-be-transmitted data indicates that an error occurs in an Ethernet frame, wherein the Ethernet frame comprises the initial fragment, wherein the initial fragment comprises a destination media access control (MAC) address field, wherein a first value of the destination MAC address field is equal to a first MAC address of a destination device, and wherein a second MAC address of a forwarding device is not equal to the first value; and
    sending the first fragment to the destination device.

11. The method of claim 10, wherein the Ethernet frame further comprises a second fragment, wherein before receiving the first fragment and before the error occurs in the Ethernet frame, the method further comprises changing the second fragment to the first fragment.

12. The method of claim 11, wherein the to-be-transmitted data in the second fragment comprises a frame check sequence (FCS) field of the Ethernet frame.

13. The method of claim 10, wherein after receiving the initial fragment and the first fragment and before sending the first fragment to the destination device, the method further comprises determining that the second MAC address is not equal to the first value based on the destination MAC address field, and wherein sending the first fragment to the destination device comprises sending the first fragment to the destination device in response to the determining that the MAC address of the forwarding device is not equal to the first value.

14. The method of claim 10, wherein the network device comprises a physical coding sublayer receiver (PCS) receiver, and wherein after receiving the first fragment, the method further comprises entering, by the PCS receiver, a receiver enable (RX_E) state in response to the to-be-transmitted data.

15. The method of claim 10, wherein the first fragment comprises a receiver control (RxC) field and a receive data (RxD) field, wherein the RxC field carries the type indication information, and wherein the RxD field carries the to-be-transmitted data.

16. The method of claim 15, wherein a second value of the RxC field is equal to 1, and wherein a third value of the RxD field is equal to 0xFE.

17. The method of claim 10, wherein the first fragment comprises a synchronization header field, a block type field, and a plurality of pieces of to-be-transmitted data, wherein the pieces comprise the to-be-transmitted data, wherein the type indication information comprises the synchronization header field and the block type field, wherein the type indication information indicates that a type of the to-be-transmitted data is the control character, and wherein the type indication information indicates a location of the to-be-transmitted data in the pieces.

18. The method of claim 17, wherein a fourth value of the synchronization header field is equal to 0x10, and wherein a fifth value of the to-be-transmitted data is equal to 0x1E.

19. The method of claim 10, further comprising determining the error occurs in the Ethernet frame using a cyclic redundancy check (CRC).

20. A network device, comprising:

a receiver configured to receive a plurality of fragments of an Ethernet frame, wherein the fragments comprise an initial fragment and a first fragment, and wherein the initial fragment comprises a destination media access control (MAC) address field;

a processor coupled to the receiver and configured to:

determine a frame check sequence (FCS) value of the Ethernet frame based on the fragments;

determine, based on the FCS value, that an error occurs in the Ethernet frame; and change the first fragment to a second fragment in response to the error, wherein the first fragment comprises first type indication information and first to-be-transmitted data, wherein the first type indication information indicates a first type of the first to-be-transmitted data, wherein the second fragment comprises second type indication information and second to-be-transmitted data, wherein the second type indication information indicates that a second type of the second to-be-transmitted data is a control character, wherein a first value of the first to-be-transmitted data is not equal to a second value of the second to-be-transmitted data, and wherein the second to-be-transmitted data indicates that the error occurs; and a transmitter coupled to the processor and configured to send the second fragment to a destination device, wherein a third value of the destination MAC address field is equal to a first MAC address of the destination device, and wherein the first MAC address is not equal to a second MAC address of a forwarding device.

* * * * *